(12) United States Patent
Schleiss et al.

(10) Patent No.: US 8,103,367 B2
(45) Date of Patent: Jan. 24, 2012

(54) METHODS AND APPARATUS TO DRAW ATTENTION TO INFORMATION PRESENTED VIA ELECTRONIC DISPLAYS TO PROCESS PLANT OPERATORS

(75) Inventors: Duncan Schleiss, Austin, TX (US); Cindy Scott, Georgetown, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 445 days.

(21) Appl. No.: 12/275,016

(22) Filed: Nov. 20, 2008

(65) Prior Publication Data

US 2010/0123594 A1 May 20, 2010

(51) Int. Cl.
*G05B 15/00* (2006.01)

(52) U.S. Cl. ............ 700/83; 700/80; 340/679; 340/511; 340/517; 715/970

(58) Field of Classification Search .................. 340/569, 340/511, 517; 700/80, 83; 715/771, 970
See application file for complete search history.

(56) References Cited

U.S. PATENT DOCUMENTS

| | | | | |
|---|---|---|---|---|
| 4,570,217 A | * | 2/1986 | Allen et al. | 700/83 |
| 4,749,985 A | * | 6/1988 | Corsberg | 340/517 |
| 4,988,996 A | * | 1/1991 | Ito | 340/984 |
| 5,187,776 A | | 2/1993 | Yanker | |
| 5,325,522 A | * | 6/1994 | Vaughn | 1/1 |
| 5,353,400 A | * | 10/1994 | Nigawara et al. | 715/771 |
| 5,638,523 A | | 6/1997 | Mullet et al. | |
| 5,923,325 A | | 7/1999 | Barber et al. | |
| 6,288,702 B1 | | 9/2001 | Tachibana et al. | |
| 6,335,740 B1 | | 1/2002 | Tanaka | |
| 6,396,516 B1 | | 5/2002 | Beatty | |
| 6,462,750 B1 | | 10/2002 | Plow et al. | |
| 6,559,872 B1 | | 5/2003 | Lehikoinen et al. | |
| 7,557,702 B2 | * | 7/2009 | Eryurek et al. | 340/511 |
| 7,562,135 B2 | * | 7/2009 | Eryurek et al. | 709/224 |
| 7,676,287 B2 | * | 3/2010 | Eryurek et al. | 700/83 |
| 2004/0181549 A1 | | 9/2004 | Pate | |
| 2010/0222899 A1 | * | 9/2010 | Blevins et al. | 700/80 |

FOREIGN PATENT DOCUMENTS

| | | |
|---|---|---|
| EP | 0389132 | 9/1990 |
| GB | 2284734 | 6/1995 |
| GB | 2294793 | 5/1996 |
| JP | 10187233 | 7/1998 |

OTHER PUBLICATIONS

Search Report, issued by the UK Patent Office on Feb. 19, 2010, in connection with Great Britain Application No. 0919719.5, 4 pages.

(Continued)

*Primary Examiner* — Eric M Blount
(74) *Attorney, Agent, or Firm* — Hanley, Flight & Zimmerman, LLC.

(57) ABSTRACT

Example methods and apparatus to draw attention to information presented via electronic displays to process plant operators are disclosed. A disclosed example method to draw attention to information presented to a process plant operator comprises presenting an electronic process plant display, collecting process plant data, processing the process plant data to identify a portion of a process plant, and modifying the electronic process plant display to at least partially obscure substantially all of the process plant display except for the identified portion.

29 Claims, 7 Drawing Sheets

OTHER PUBLICATIONS

Download Yahoo! Installer; Author Unknown; http://downloads.yahoo.com/installer/?done=close&pname=the%2Dealendar%20Widget; Jun. 23, 2008; 1 page.

Andreas Volkel, "Individuelle Optimierung von Mensch-Maschine-Schnittstellen auf Grundlage evolutionirer Mechanismen" Automatisierungstechnische Praxis, vol. 50, No. 9, Sep. 2008, pp. 48-57, XP002572155 (10 pages).

Search Report, issued by the European Patent Office on Mar. 19, 2010, in connection with European Application No. 09176291.4 (6 pages).

* cited by examiner

METHODS AND APPARATUS TO DRAW ATTENTION TO INFORMATION PRESENTED VIA ELECTRONIC DISPLAYS TO PROCESS PLANT OPERATORS

FIELD OF THE DISCLOSURE

This disclosure relates generally to process plants and, more particularly, to methods and apparatus to draw attention to information presented via electronic displays to process plant operators.

BACKGROUND

Graphics-based process plant operator displays are used pervasively throughout the process control industry to provide users and/or operators with information about the operation of a process plant. To display ever-increasing amounts of information to fewer and fewer plant personnel, more complex and/or larger displays are being used. Such operator displays serve a wide range of user needs. For example, an operator display allows an operator and/or process control engineer to configure customized graphs containing views of their process plant that allow them to view their process(es), quickly gain an understanding of process and/or plant conditions, and/or control equipment, run batches, modify the process, enter logs, view production data, pull up emissions data, etc.

SUMMARY

A disclosed example method to draw attention to information presented to a process plant operator includes presenting an electronic process plant display, collecting process plant data, processing the process plant data to identify a portion of a process plant, and modifying the electronic process plant display to at least partially obscure substantially all of the process plant display except for the identified portion.

A disclosed example operator station apparatus includes a display, an operator display module to present an operator application on the display, and a spotlighter to analyze process plant data to identify a portion of a process plant and to obscure a portion the operator application, wherein the portion of the operator application does not include the identified portion of the process plant.

Another disclosed example method to draw attention to information presented to a process plant operator includes presenting an electronic process plant display, collecting process plant data, processing the process plant data to identify a portion of a process plant, identifying a geometric region surrounding the identified portion of the process plant display, and highlighting the portion of the electronic process plant display inside the geometric region to draw attention to the portion of the process plant depicted inside the geometric region.

DETAILED DESCRIPTION

Figure 1:
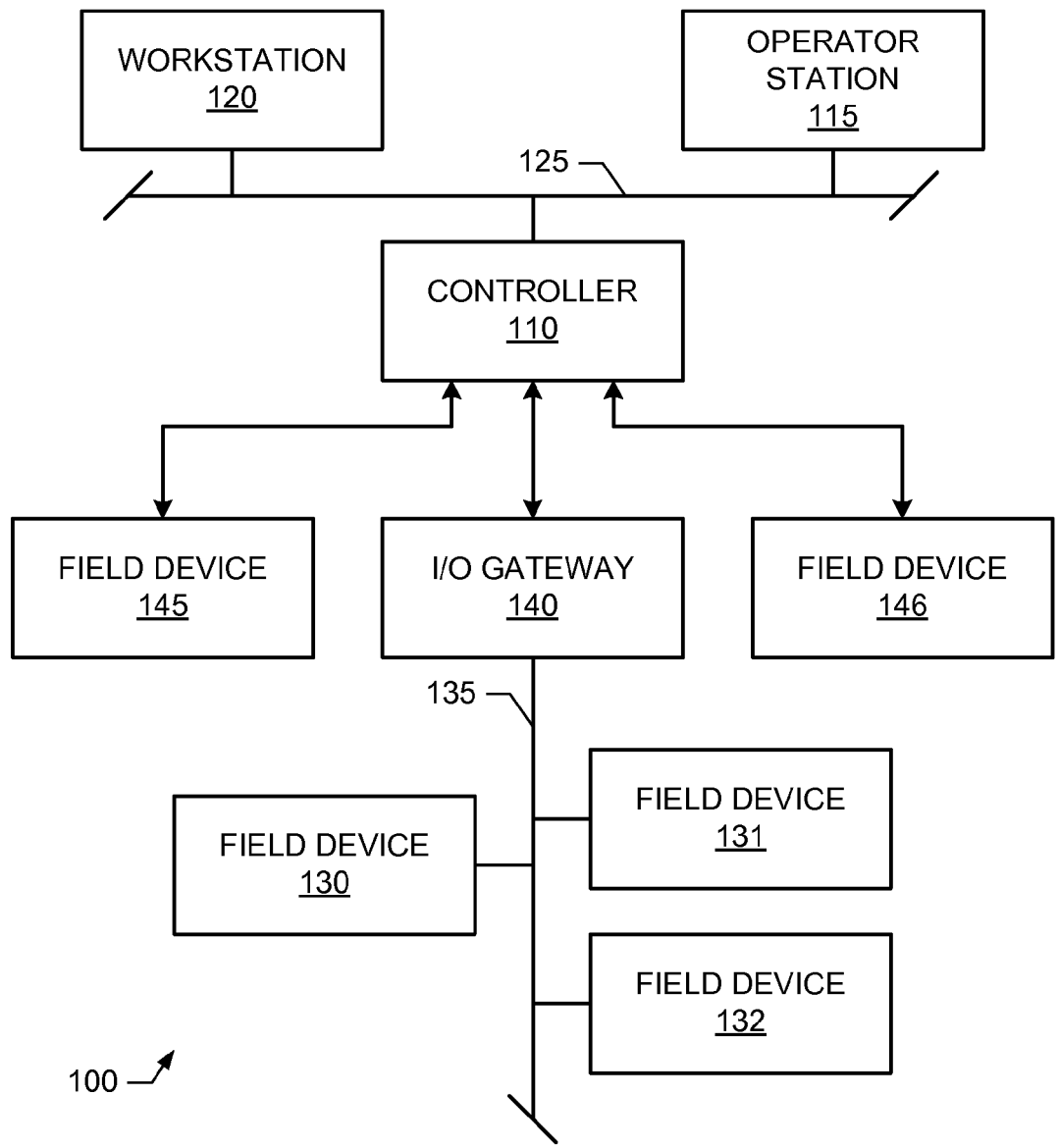
FIG. 1 is a schematic illustration of an example process control system constructed in accordance with the teachings of the invention.

In a control room environment, a process plant operator display provides process plant operators and other plant manufacturing personnel with an overview of and detailed information on all parts of the process, the process equipment, as well as the control system itself. Because the process plant operator display is a main focal point in the control room, it is often surrounded by other equipment such as phones, live video feeds, log books, and/or other devices. To support the many tasks that plant personnel are required to perform, operator displays often include navigation links that allow them to gain access to information related to scheduling, materials handling, shop floor procedures, etc. While such devices and/or capabilities can enhance collaboration between users and/or operators, and/or enhance the effectiveness of operators, they represent additional sources of information that compete for the attention of a process plant operator.

In some instances, operators, especially in off-shifts and weekends, find themselves working with limited support and/or may need to perform duties that require them to leave the operator application. In such circumstances, it is critical that the process, process equipment, and control system functions can be used to diagnose problems without operator involvement and provide the operators with advanced warnings related to conditions that are likely to occur (e.g., a possible stuck valve, plugged line, fowled heater, etc). For example, the incorporation of Abnormal Situation Prevention technology and techniques are becoming critical features of control systems. However, even with the use of such technologies, process plant operators have a great deal of information competing for their attention. Spotlighting can provide clear visual indication of important process changes, even when the display is viewed from a distance. Moreover, spotlighting can also provide clear visual indication of important process changes that can be readily identified when an operator returns to an operator display and/or application, and/or changes from one active display window to another display window within an operator display and/or application.

Computing devices and visual display device technology are also making significant advances. While in the past it was typical for operator displays to run on dedicated workstations, this is no longer as typical. Looking ahead, operator display will need to run on workstations, laptops, tablet computers, and personal digital assistants (PDAs). Process plant operator display designers need to create displays that are easy to use, look good, are functional, and perform well on everything from high-performance graphics stations to the more graphically challenged environments of tablet computers and PDAs. In such examples, screen sizes and resolutions may vary widely. Thus, regardless of screen size and/or resolution, operators and other plant personnel need displays that are functional and which can quickly call their attention to important matters or information.

Traditionally, to call attention to problems that have occurred (alarms), changes in process values (numbers changing on a display, a change in a bar graph, etc.) and/or problems that are likely to occur (early event detection), a variety of techniques including alarming and display animations have been used. However, these techniques rely on the operator being constantly visually attentive to notice changes and/or require considerable up-front engineering and rely on specific knowledge of the process plant. It is common for a single process plant display to include hundreds of changing process data values. This same display could also show a dozen or more active alarms at any time. Such large amounts of data are difficult for a human to visually remember and to track. For example, if the operator is temporarily distracted from a portion of the display, it may be difficult for them to remember what states, alarms and values were previously being displayed. However, such common lapses in visual memory may result in the operator not immediately and/or not readily recognizing any important changes that may have occurred. While integrating historical trends into the displays is a traditional approach to help address this problem (especially for analog values), the use of historical trends is often not practical due to the amount of display space they consume and still require the operator to consciously check the trends. So important changes in plant conditions, even when shown on the display, can be easily missed if the operator is not consciously and/or actively monitoring those data values.

In general, the example apparatus, methods, and articles of manufacture described herein may be used to automatically identify portions of a process plant and/or process that require attention of an operator, and to automatically modify the operator display to highlight such portions or elements while optionally obscuring other portions or elements of the operator display. In contrast to traditional alarming and display animations that must be engineered using specific knowledge of the process plant, the example methods, apparatus and articles of manufacture described herein utilize generally-applicable rules and/or filters to identify portions of a process plant that have and/or are changing and, thus, may be in need of attention by an operator. Consider an example operator display that is currently displaying tens or hundreds of alarms, process variables, etc. In such an example, the operator may need to quickly identify the portion of the process plant most in need of their attention. However, visually identifying such a portion of the process plant may be difficult using existing process plant operator displays. To assist the operator, the example methods and apparatus described herein apply one or more rules, filters and/or heuristics to identify portions or elements of the process plant in need of attention, and modify the operator display to highlight such elements or portions while optionally obscuring other portions or elements of the operator display. As described herein, such rules, filters and/or heuristics can be defined and/or implemented without specific knowledge of the process plant. Example rules, filters and/or heuristics highlight, spotlight and/or otherwise draw specific attention to, for example, conditions that have recently changed, conditions that are currently changing, conditions that are changing in a new way (e.g., at a new rate of change). For example, any or all new alarms, any or all alarm activation changes, a process variable having a large deviation, a status change, a flag, a flag change, a new item, a new variable, a most recent change in state, a cluster of alarms, a deviation in the rate of change, a bad input, a troublesome control loop, a faulty device, a chronically sticky valve, or a fault may be identified and spotlighted.

FIG. 1 is a schematic illustration of an example process control system 100. The example process control system 100 of FIG. 1 includes one or more process controllers (one of which is designated at reference numeral 110), one or more operator stations (one of which is designated at reference numeral 115), and one or more workstations (one of which are designated at reference numeral 120). The example process controller 110, the example operator station 115 and the workstation 120 are communicatively coupled via a bus and/or local area network (LAN) 125, which is commonly referred to as an application control network (ACN).

The example operator station 115 of FIG. 1 allows a process plant operator to review and/or operate one or more operator display screens and/or applications that enable the process plant operator to view process plant variables, view process plant states, view process plant conditions, view process plant alarms, and/or to change process plant settings (e.g., set points and/or operating states, clear alarms, silence alarms, etc.). Such screens and/or applications are typically designed and/or implemented by process configuration engineers. An example manner of implementing the example operator station 115 of FIG. 1 is described below in connection with FIG. 2. Example operator display applications that may be used to implement the example operator station 115 are described below in connection with FIGS. 3, 4 and 5.

The example operator station 115 of FIG. 1 includes and/or implements a spotlighter 230 (FIG. 2) that automatically identifies information, data, alarms, equipment and/or any other element or portion of a process plant that may be in need of attention by an operator. When such elements are identified, an operator display presented at the operator station is automatically modified to draw operator attention to the identified element(s) (see FIGS. 4 and/or 5). In some examples, an operator may configure and/or define the rules, filters and/or heuristics that are used to identify process control elements to which attention should be drawn. For example, the operator may specify that the newest or most recent alarm is to be spotlighted. Additionally or alternatively, the operator may specify that the newest alarm is to be spotlighted unless a process variable is more than 50% out-of-bounds, in which case, the out-of-bounds process variable is to be spotlighted. It should be appreciated that the operator and/or a process configuration engineer can configure and/or define such rules, filters and/or heuristics to include any number of criteria, and any number or priorities for the criteria. The rules, filters and/or heuristics used by the example spotlighter 230 are defined and/or implemented without the need for specific knowledge of the process plant. For example, a rule that selects the newest alarm, chronically stuck valves, troublesome control loops, etc. can be defined without any knowledge of the process plant and/or the process(es) implemented by the process plant. In some examples, the rules, filters and/or heuristics are statically defined. Additionally or alternatively, an operator and/or process configuration engineer can define, create and/or specify spotlighting rules, filters and/or heuristics while the process plant is operating.

The example workstation 120 of FIG. 1 may be configured as an application station to perform one or more information technology applications, user-interactive applications and/or communication applications. For example, the workstation 120 may be configured to perform primarily process control-related applications, while another application station (not shown) may be configured to perform primarily communication applications that enable the process control system 100 to communicate with other devices or systems using any desired communication media (e.g., wireless, hardwired, etc.) and protocols (e.g., HTTP, SOAP, etc.). The example operator station 115 and the example workstation 120 of FIG. 1 may be implemented using one or more workstations and/or any other suitable computer systems and/or processing systems. For example, the operator station 115 and/or workstation 120 could be implemented using single processor personal computers, single or multi-processor workstations, etc.

The example LAN 125 of FIG. 1 may be implemented using any desired communication medium and protocol. For example, the LAN 125 may be based on a hardwired and/or wireless Ethernet communication scheme. However, as will be readily appreciated by those having ordinary skill in the art, any other suitable communication medium(s) and/or protocol(s) could be used. Further, although a single LAN 125 is illustrated in FIG. 1, more than one LAN and/or other alternative pieces of communication hardware may be used to provide redundant communication paths between the example systems of FIG. 1.

The example controller 110 of FIG. 1 is coupled to a plurality of smart field devices 130, 131 and 132 via a digital data bus 135 and an input/output (I/O) gateway 140. The smart field devices 130-132 may be Fieldbus compliant valves, actuators, sensors, etc., in which case the smart field devices 130-132 communicate via the digital data bus 135 using the well-known Foundation Fieldbus protocol. Of course, other types of smart field devices and communication protocols could be used instead. For example, the smart field devices 130-132 could instead be Profibus and/or HART compliant devices that communicate via the data bus 135 using the well-known Profibus and HART communication protocols. Additional I/O devices (similar and/or identical to the I/O gateway 140 may be coupled to the controller 110 to enable additional groups of smart field devices, which may be Foundation Fieldbus devices, HART devices, etc., to communicate with the controller 110. Such smart field devices may provide more data and/or information than non-smart field devices and, thus, may contribute to the information overload problem(s) addressed by the methods and apparatus described herein.

In addition to the example smart field devices 130-132, one or more non-smart field devices 145 and 146 may be communicatively coupled to the example controller 110. The example non-smart field devices 145 and 146 of FIG. 1 may be, for example, conventional 4-20 milliamp (mA) or 0-10 volts direct current (VDC) devices that communicate with the controller 110 via respective hardwired links.

The example controller 110 of FIG. 1 may be, for example, a DeltaV™ controller sold by Fisher-Rosemount Systems, Inc., an Emerson Process Management company. However, any other controller could be used instead. Further, while only one controller 110 is shown in FIG. 1, additional controllers and/or process control platforms of any desired type and/or combination of types could be coupled to the LAN 125. In any case, the example controller 110 performs one or more process control routines associated with the process control system 100 that have been generated by a system engineer and/or other system operator using the operator station 115 and which have been downloaded to and/or instantiated in the controller 110.

While FIG. 1 illustrates an example process control system 100 within which the methods and apparatus to draw attention to information presented to process plant operators described in greater detail below may be advantageously employed, persons of ordinary skill in the art will readily appreciate that the methods and apparatus to control information presented to process plant operators described herein may, if desired, be advantageously employed in other process plants and/or process control systems of greater or less complexity (e.g., having more than one controller, across more than one geographic location, etc.) than the illustrated example of FIG. 1.

Figure 2:
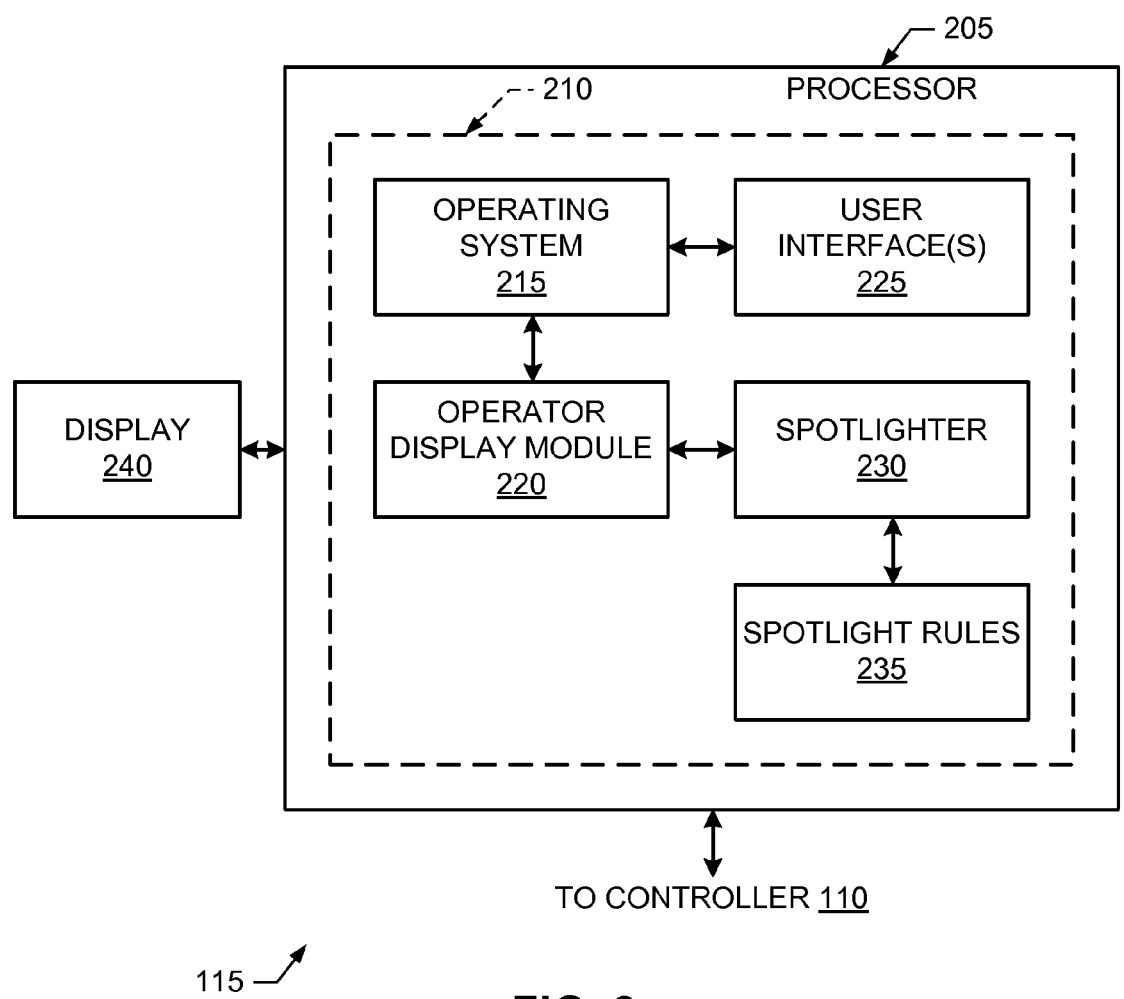
FIG. 2 illustrates an example manner of implementing the example operator station of FIG. 1.

FIG. 2 illustrates an example manner of implementing the example operator station 115 of FIG. 1. The example operator station 115 of FIG. 2 includes at least one programmable processor 205. The example processor 205 of FIG. 2 executes coded instructions present in a main memory 210 of the processor 205 (e.g., within a random-access memory (RAM) and/or a read-only memory (ROM)). The processor 205 may be any type of processing unit, such as a processor core, a processor and/or a microcontroller. The processor 205 may execute, among other things, an operating system 215, an operator display module 220, user interfaces 225, the example spotlighter 230, and a spotlight rules database 235. An example operating system 215 is an operating system from Microsoft®. The example main memory 210 of FIG. 2 may be implemented by and/or within the processor 205 and/or may be one or more memories and/or memory devices operatively coupled to the processor 205.

To allow an operator to interact with the example processor 205, the example operator station 115 of FIG. 2 includes any type of display 240. Example displays 240 include, but are not limited to, a computer monitor, a computer screen, a television, a mobile device (e.g., a smart phone), etc. capable to display user interfaces and/or applications implemented by the processor 205 and/or, more generally, the example operator station 115.

The example operating system 215 of FIG. 2 displays and/or facilitates the display of application user interfaces (e.g., any of the example user interfaces 225) by and/or at the example display 240. To facilitate operator interactions with applications implemented by the example operator station 115, the example operating system 215 implements an application programming interface (API) by which the example operator display module 220 can define and/or select a user interface 225, and cause and/or instruct the operating system 215 to display the defined and/or selected user interface 225. The example operating system 215 also implements an API by which the example spotlighter 230 of FIG. 2 can modify a user interface 225 and/or specify how one or more portions or elements of a user interface 225 are to be highlighted and/or spotlighted. Example user interfaces 225 are described below in connection with FIGS. 3, 4 and 5.

To present process plant operator displays and/or applications, the example operator station 115 of FIG. 2 includes the example operator display module 220. The example operator display module 220 of FIG. 2 collects data and/or information from one or more process controllers (e.g., the example controller 110 of FIG. 1) and/or other elements of a process plant control system, and uses the collected data and/or information to create and/or define a particular user interface 225 (e.g., the example interface of FIG. 3) based on the state of the process plant and/or a portion of the process plant selected by an operator. The created and/or defined display is displayed at the example display 240 by and/or via the example operating system 215. The example operator display module 220 also receives operator inputs via the user interface 225 (e.g., in response to the operator selecting, adjusting and/or operating user interface elements of the user interface 225) and sends appropriate commands, data and/or information to the controller 110 and/or, more generally, the process control system 100.

Using process control data and/or information collected by and/or provided to the example operator station 115, the example spotlighter 230 of FIG. 2 identifies one or more alarms, variables, equipment and/or any other elements of an operator display to which operator attention should be drawn. The example spotlighter 230 applies one or more of the spotlight rules, filters and/or heuristics 235 to identify the process plant elements to be spotlighted. When and/or as process plant elements to be spotlighted are identified, the example spotlighter 230 notifies the operator display module 220 to highlight the identified element while optionally wholly or partially obscuring other portions of a user interface 225. For example, the spotlighter 230 can specify the portion(s) or element(s) to be highlighted, with the operator display module 220 making the corresponding modifications to the user interface 225. Additionally or alternatively, the example spotlighter 230 can specify which portion(s) of a user interface 225 (e.g., a circular region, a rectangular region, an oval region, a star shaped region, etc.) are to be highlighted (i.e., left un-obscured and/or colored so as to standout, be highlighted and/or have a glowing appearance) and which portion(s) are to be optionally wholly or partially obscured. Portions of a user interface 225 can be obscured, for example, by "graying them out," diminishing them in appearance, desaturating the colors used to display them, and/or by overlaying a partially or wholly transparent layer of a neutral color or pattern (e.g., gray).

A portion or element of an operator display can be "un-spotlighted" based on any number and/or type(s) of conditions and/or rules. For example, a portion or element could be spotlighted for a configurable length of time and then automatically un-spotlighted, a portion or element could remain spotlighted until another portion or element is identified to be spotlighted, a portion or element could remain spotlighted until an operator acknowledges the portion or element, etc. Moreover, in some examples, an operator is able to enable and/or disable the automatic spotlighting of portions or elements of an operator display. Further still more than one portion and/or element can be simultaneously spotlighted. Moreover, portions and/or elements of hidden, unopened and/or inactive operator display windows can be spotlighted such that when operator attention is directed to a newly visible, a newly opened and/or a newly active operator display window operator attention can be quickly and/or substantially immediately drawn to one or more items in need of attention.

To store rules used by the example spotlighter 230, the example operator station 210 of FIG. 2 includes the spotlight rules database 235. Using any type(s) and/or number of languages (e.g., XML), records, fields and/or entries, the example spotlight rules database 235 of FIG. 2 stores rules, filters and/or heuristics used by the spotlighter 230 to identify particular alarms, variables, equipment and/or any other elements of process plant to which operator attention should be drawn. The example spotlight rules database 235 may be stored using any type(s) and/or numbers of memory(-ies) and/or memory device(s). The rules, filters and/or heuristics stored in the spotlight rules database 235 and used by the example spotlighter 230 are defined and/or implemented without specific knowledge of a particular process plant. For example, a rule that selects the newest alarm or alarm activation change within a specified period of time (e.g., one minute) can be defined without any knowledge of the process plant and/or the process(es) implemented by the process plant. In some examples, the example rules, filters and/or heuristics 235 are statically defined. Additionally or alternatively, an operator and/or process configuration engineer can define, create and/or specify spotlighting rules, filters and/or heuristics 235 while the process plant is operating.

While an example manner of implementing the example operator station 115 of FIG. 1 has been illustrated in FIG. 2, the data structures, elements, processes and devices illustrated in FIG. 2 may be combined, divided, re-arranged, omitted, eliminated and/or implemented in any other way. Further, the example operating system 215, the example operator display module 220, the example user interface(s) 225, the example spotlighter 230, the example spotlight rules database 235 and/or, more generally, the example operator station 115 of FIG. 2 may be implemented by hardware, software, firmware and/or any combination of hardware, software and/or firmware. Further still, the example operator station 115 may include additional elements, processes and/or devices instead of, or in addition to, those illustrated in FIG. 2, and/or may include more than one of any or all of the illustrated data structures, elements, processes and devices. Moreover, while the example operator station 115 of FIG. 1 operates to spotlight operator displays without consulting a shared server, the example spotlighter 230 of FIG. 2 could, additionally or alternatively, consult a shared server to determine which portion(s) of an operator display to which attention should be drawn.

Figure 3:
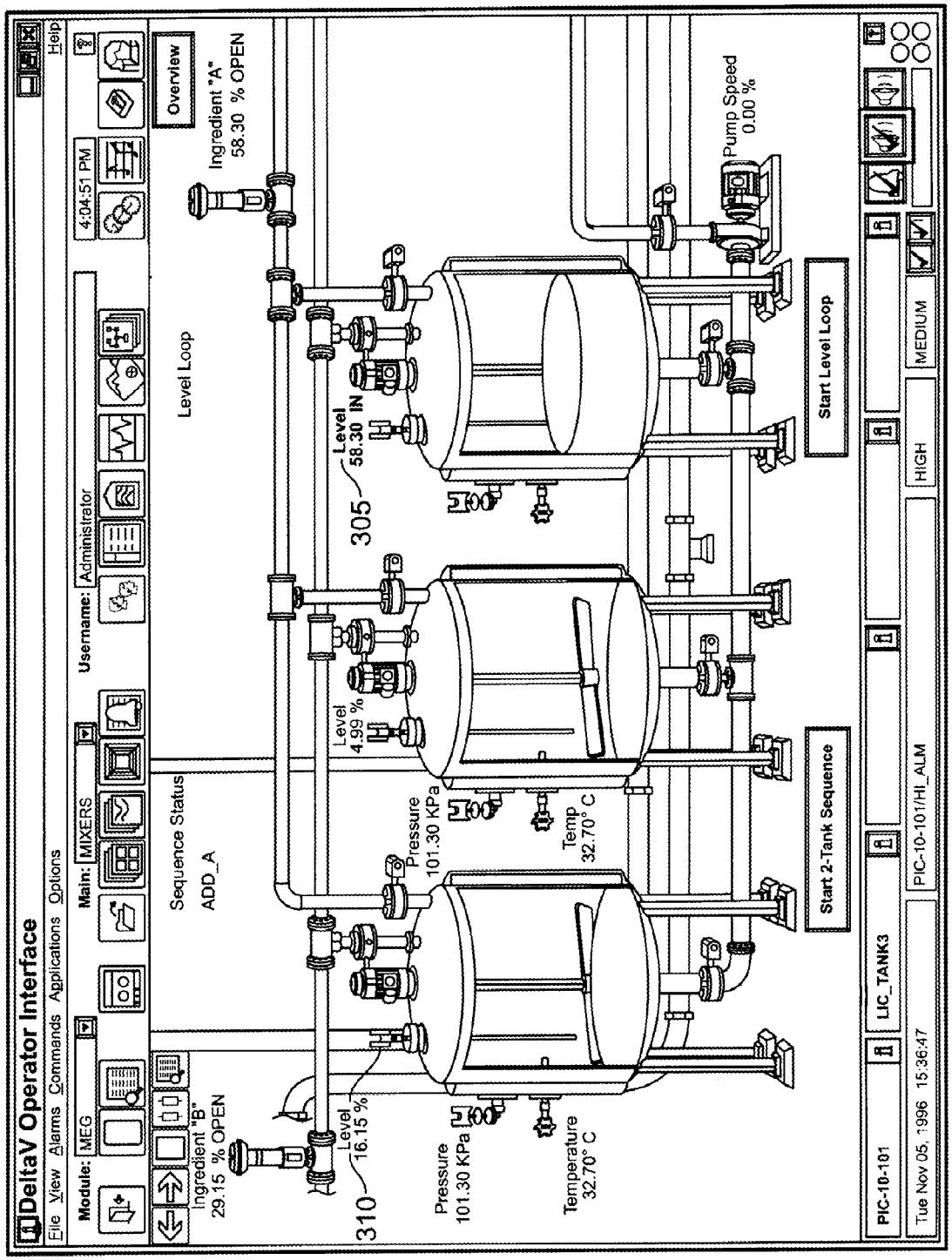
FIGS. 3, 4 and 5 illustrate example user interfaces that may be used to implement an operator display and/or application and/or, more generally, the example operator station of FIG. 1.
Figure 4:
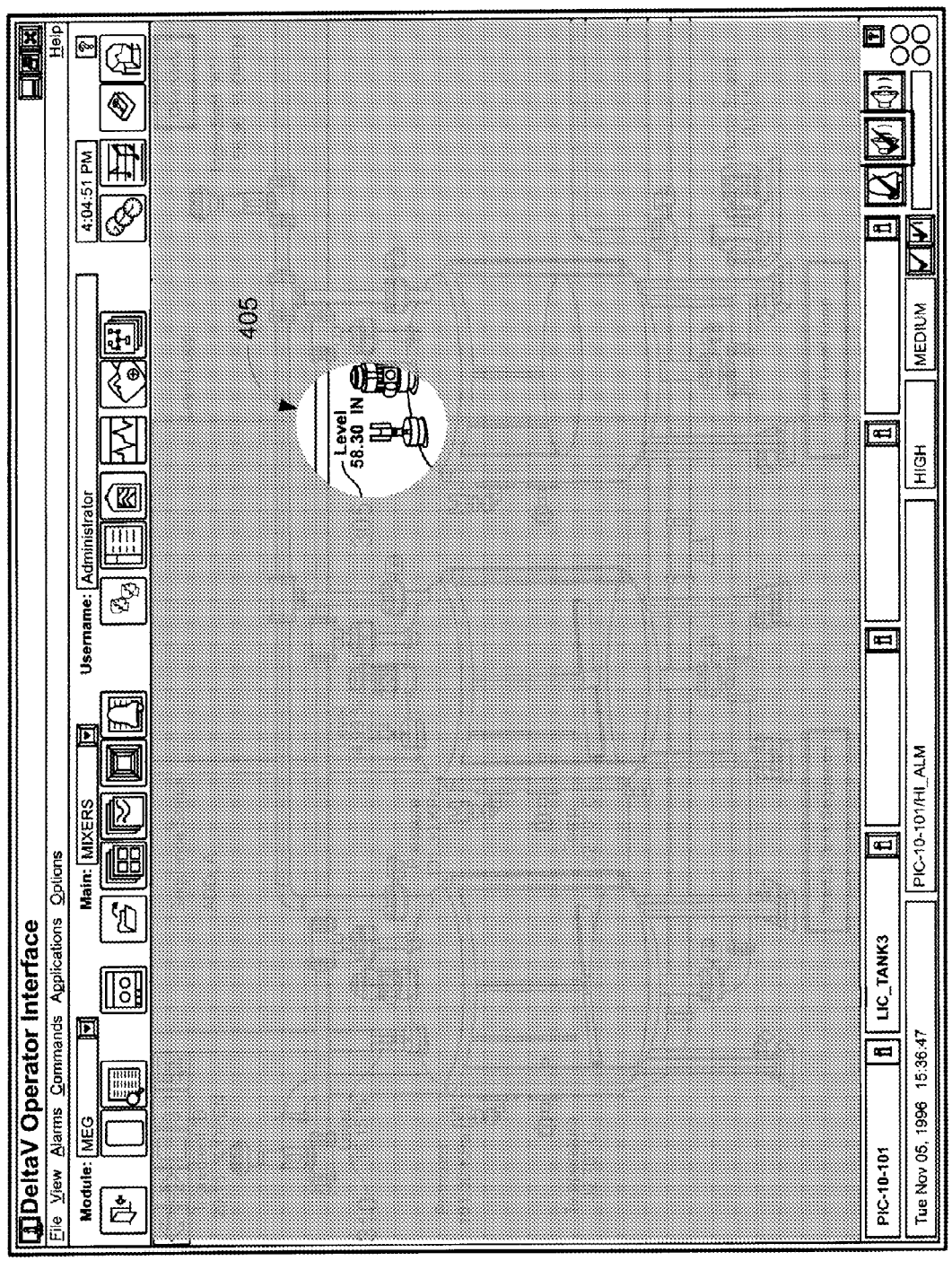
Figure 5:
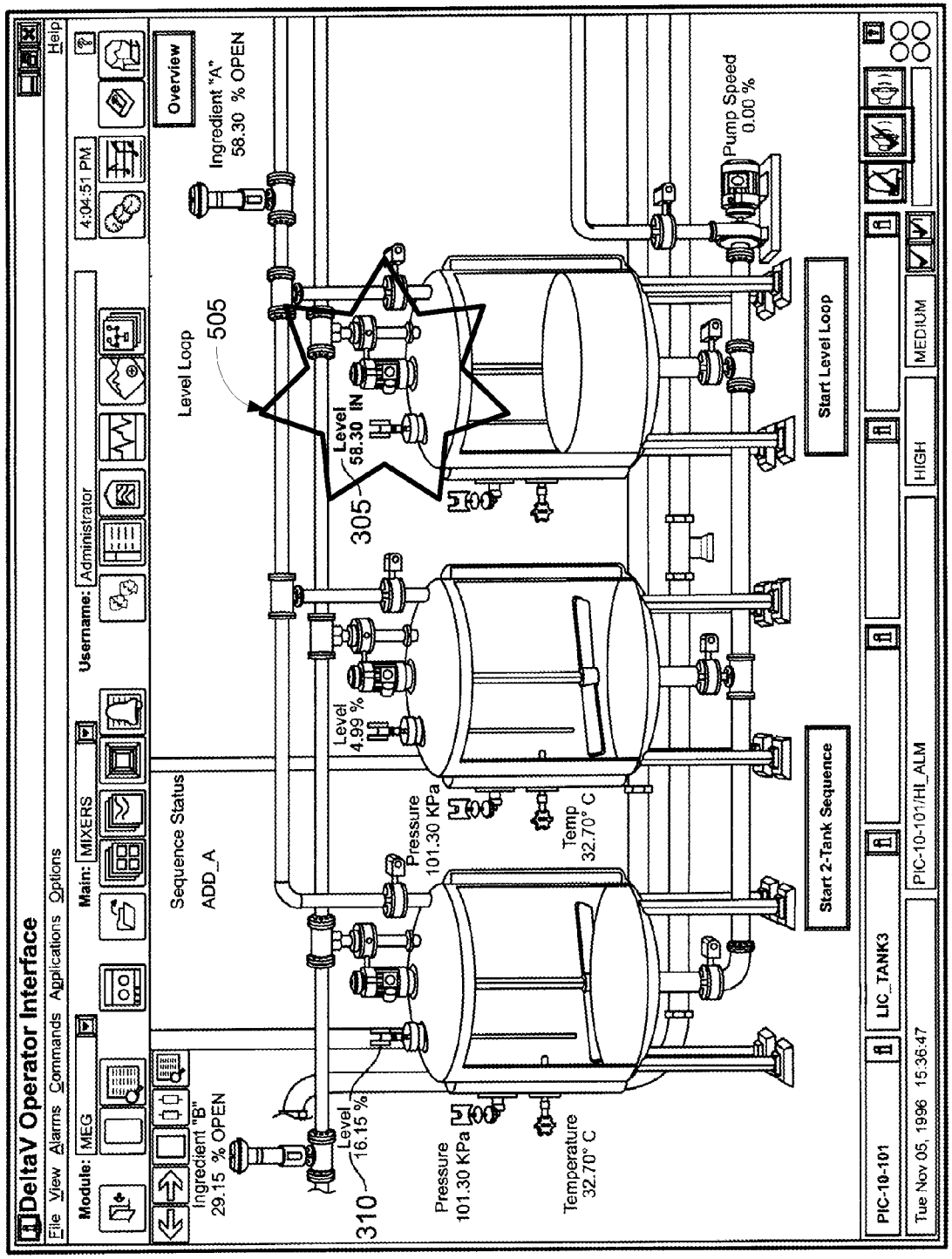

FIGS. 3, 4 and 5 illustrate example user interfaces that may be used to implement an operator display and/or operator application, and/or, more generally, the example operator station 115 of FIG. 1. The example user interface of FIG. 4 is another version of the example user interface of FIG. 3 after an element of the process plant to which attention should be drawn has been identified, and the element has been highlighted and/or spotlighted in the user interface.

To display process data and/or information, the example user interface of FIG. 3 includes any number of display user interface elements, two of which are designated in FIG. 3 with reference numerals 305 and 310. The example display element 305 displays the current level in the rightmost (LIC_TANK3) tank. Likewise, the example display element 310 displays the current level in the leftmost tank.

Based on process plant data, information and/or variables collected from the process plant, the example spotlighter 230 of FIG. 2 determines that the level 305 of the rightmost tank is to be highlighted, as shown in FIG. 4. As illustrated in FIG. 4, a circular region 405 surrounding the level 305 is unobscured (e.g., unmodified) while substantially the rest of the operator display is partially obscured. As shown, the attention of an operator using the example user interface of FIG. 4 is easily and/or rapidly drawn to the level 305. While only the level 305 is spotlighted in FIG. 4, other elements of the operator display of FIGS. 3 and 4 could likewise be highlighted. Moreover, more than one element of an operator display could be highlighted at the same time, as determined by the rules, filters and/or heuristics 240 used by the spotlighter 230.

The example user interface of FIG. 5 illustrates yet another version of the example user interface of FIG. 3 after an element of the process plant to which attention should be drawn has been identified, and the element has been highlighted and/or spotlighted in the user interface. In the illustrated example of FIG. 5, a region 505 around the level 305 highlighted so as to draw attention to the region 505. For instance, the example region 505 may be depicted, colored and/or shaded so as to make the region 505 appears as if it is, for example, glowing. Moreover, a geographic region may be moved, have its color changed and/or otherwise modified so as to readily draw attention to a portion of an operator display.

In some examples, when a portion of an operator display no longer needs to be spotlighted, spotlighting is faded and/or otherwise diminished over time over to draw attention to an operator that the process plant element no longer needs attention. Additionally or alternatively, the method used to highlight a portion of an operator display depends on how the operator display is currently being used. For example, when an operator is currently interacting with an operator display, spotlighting is performed by modifying an identified portion of the display to make it appear to glow while not impeding usage of the operator display. However, if the operator is not currently interacting with the operator display non-highlighted portions of the display can be wholly or partially obscured without risk of interfering with the operator's interaction with the operator display.

Figure 6:
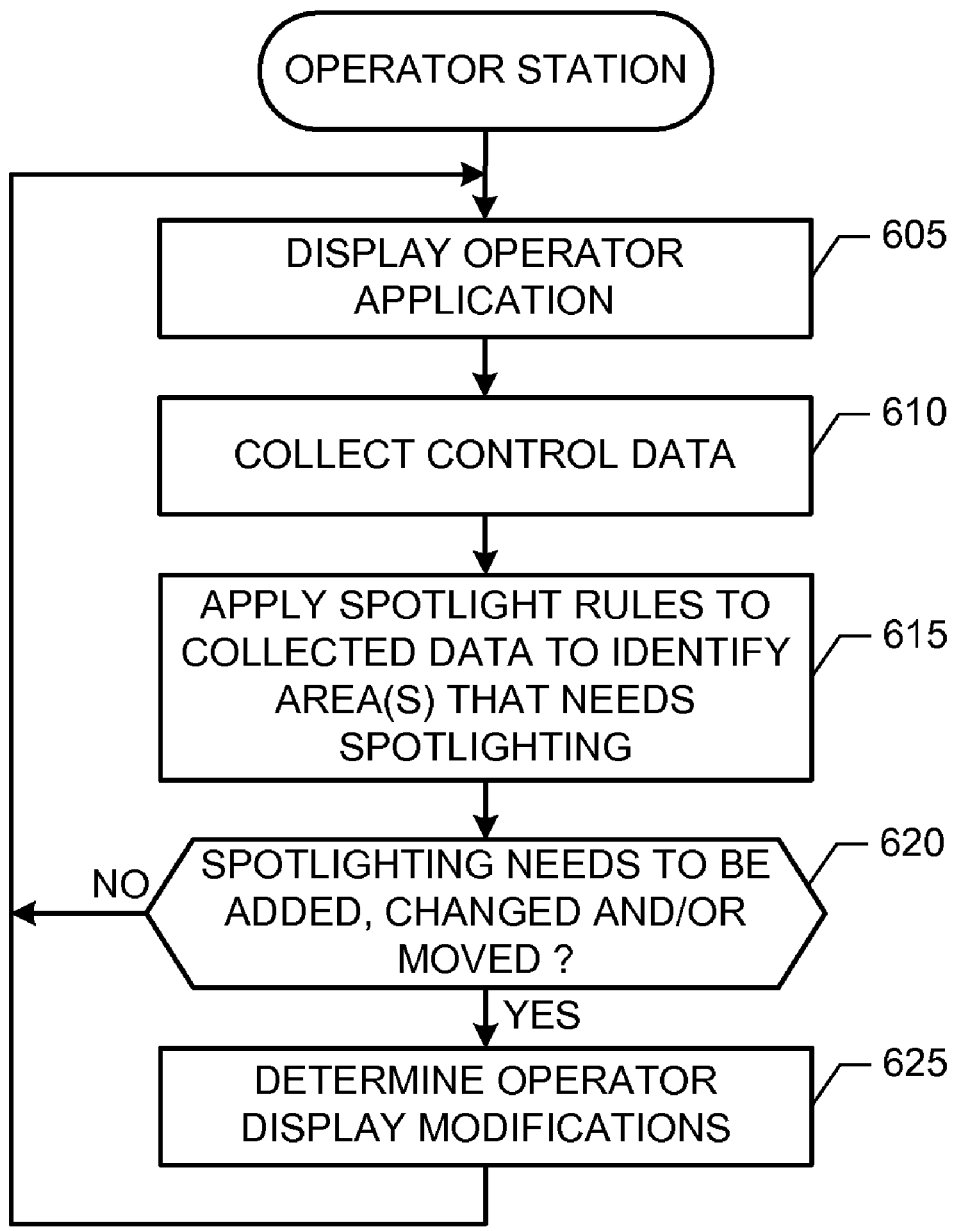
FIG. 6 is a flowchart representative of an example process that may be carried out to implement the example operator station of FIG. 1.

FIG. 6 is a flowchart representative of an example process that may be carried out to implement the example operator station 115 of FIGS. 1 and/or 2. The example process of FIG. 6 may be carried out by a processor, a controller and/or any other suitable processing device. For example, the example process of FIG. 6 may be embodied in coded instructions stored on a tangible computer and/or machine accessible and/or readable medium such as a flash memory, a ROM, random-access memory RAM, an electronically programmable ROM (EPROM), an electronically erasable programmable ROM (EEPROM), a compact disc (CD), a digital versatile disc (DVD), etc. associated with a processor (e.g., the example processor P105 discussed below in connection with FIG. 7). Alternatively, some or all of the example operations of FIG. 6 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the operations depicted in FIG. 6 may be implemented manually or as any combination of any of the foregoing techniques, for example, any combination of firmware, software, discrete logic and/or hardware. Further, although the example process of FIG. 6 is described with reference to the flowchart of FIG. 6, persons of ordinary skill in the art will readily appreciate that many other methods of implementing the example process of FIG. 6 may be employed. For example, the order of execution of the blocks may be changed, and/or some of the blocks described may be changed, eliminated, sub-divided, or combined. Additionally, persons of ordinary skill in the art will appreciate that any or all of the example operations of FIG. 6 may be carried out sequentially and/or carried out in parallel by, for example, separate processing threads, processors, devices, discrete logic, circuits, etc.

The example process of FIG. 6 begins with the example operator display module 220 displaying a user interface (e.g., the example user interface of FIG. 3) (block 605). The example operator station 115 collects and/or updates process control data, information and/or variables (block 610). The example spotlighter 230 (FIG. 2) applies one or more spotlight rules 235 to the collected and/or updated control data to determine one or more alarms, variables, equipment and/or other elements of an operator display to which attention should be drawn (block 615). If the spotlighting of one or more operator display elements is to be change (block 620), the spotlighter 230 requests and/or instructs the example operator display module 220 to modify the user interface to modify the spotlighting of the identified elements (block 625). Control then returns to block 605 to display the modified user interface. If spotlighting does not need to be changed (block 620), control returns to block 605 without modifying the user interface.

Figure 7:
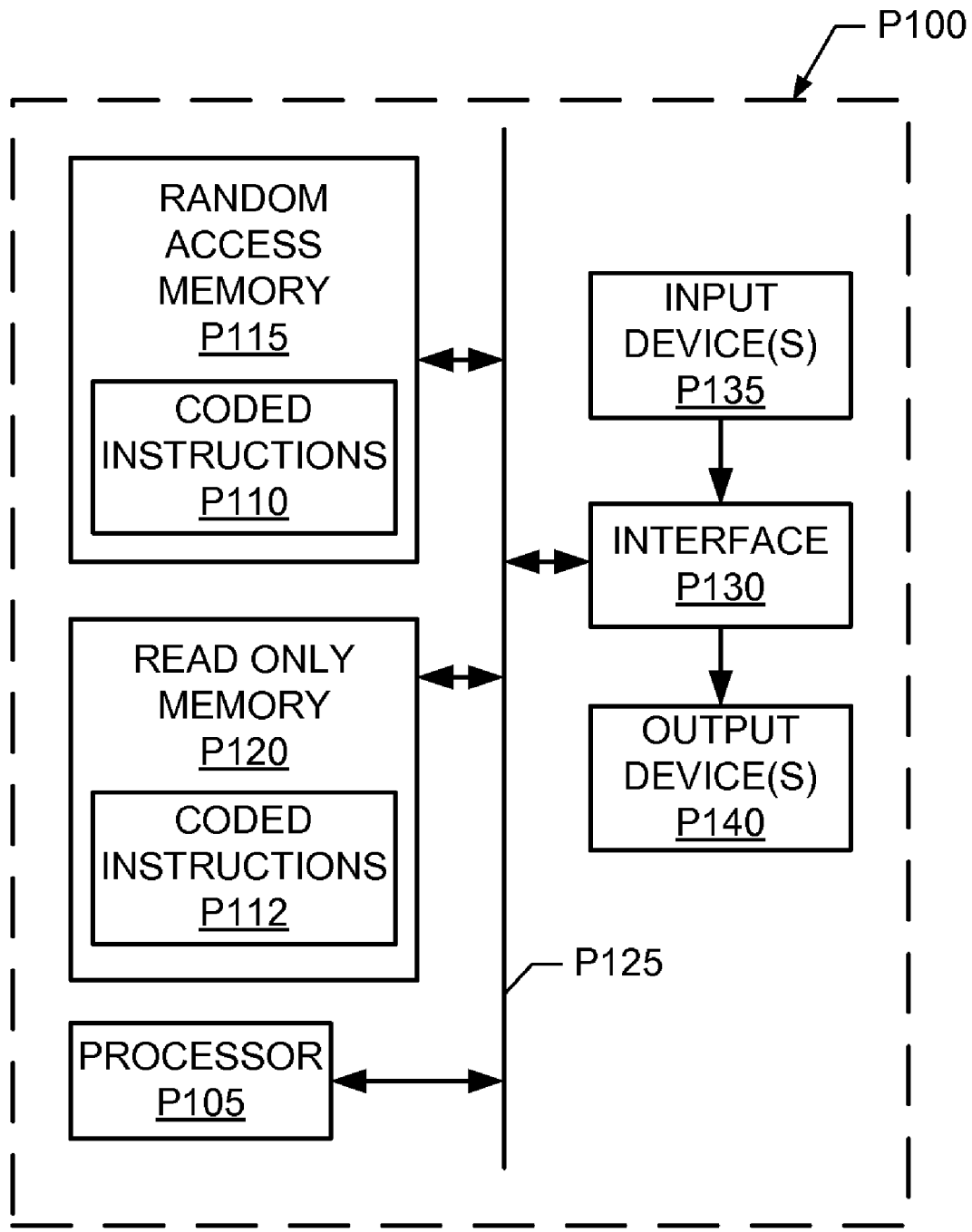
FIG. 7 is a schematic illustration of an example processor platform that may be used and/or programmed to carry out the example process of FIG. 6 and/or, more generally, to implement the example operator station of FIG. 1.

FIG. 7 is a schematic diagram of an example processor platform P100 that may be used and/or programmed to implement the example operator workstation 115 of FIGS. 1 and/or 2. For example, the processor platform P100 can be implemented by one or more general-purpose processors, processor cores, microcontrollers, etc.

The processor platform P100 of the example of FIG. 7 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example process of FIG. 6 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device(s), and ROM may be implemented by flash memory, EPROM, EEPROM, a CD, a DVD and/or any other desired type of memory device(s). Access to the memory P115 and the memory P120 may be controlled by a memory controller (not shown). The example memory P 115 may be used to implement the example spotlight rules database 235 of FIG. 2.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 may be used to, for example, collect process control data, information and/or variables. The example output devices P140 may be used to, for example, present user interfaces 225 at the example display 240 (FIG. 2)

Although certain example methods, apparatus and articles of manufacture have been described herein, the scope of coverage of this patent is not limited thereto. Such example are intended to be non-limiting illustrative examples. On the contrary, this patent covers all methods, apparatus and articles of manufacture fairly falling within the scope of the appended claims either literally or under the doctrine of equivalents.

What is claimed is:

1. A method to draw attention to information presented to a process plant operator, the method comprising:
   presenting an electronic process plant display for a process plant;
   collecting process plant data from the process plant while the process plant operates;
   processing the process plant data, using a processor, to identify an element of the process plant;
   determining whether the operator is interacting with the process plant display; and
   if the operator is not interacting with the process plant display, modifying the electronic process plant display to at least partially obscure a first portion of the process plant display that does not include the identified element.

2. A method as defined in claim 1, wherein the identified element of the process plant corresponds to at least one of a most recent alarm, a new alarm, a change in a alarm state, a status change, a flag, a flag change, a new item, a new variable, a most recent change in state, a cluster of alarms, a deviation in the rate of change, a bad input, a bad output, a troublesome control loop, a faulty device, a chronically sticky valve, or a fault.

3. A method as defined in claim 1, wherein modifying the electronic process plant display comprises:
   identifying a geometric region surrounding the identified element of the process plant display; and
   obscuring the portion of the electronic process plant display outside the geometric region.

4. A method as defined in claim 1, wherein a second portion of the electronic process plant display that includes the identified element is at least one of unobscured or unmodified when the first portion is modified.

5. A method as defined in claim 1, wherein the modifying the electronic process plant display to at least partially obscure the first portion comprises at least one of desaturing the first portion, diminishing the first portion in appearance or overlaying a partially transparent image on the first portion.

6. A method as defined in claim 3, wherein the geometric region comprises at least one of a circular region, an oval region, a star shaped region, or a rectangular region.

7. A method as defined in claim 1, wherein the element of the process plant is associated with a piece of equipment of the process plant.

8. A method as defined in claim 1, wherein the process plant display comprises an active display window.

9. A method as defined in claim 1, wherein collecting process plant data and processing the process plant data to identify the element of the process plant are performed at an operator station.

10. An operator station apparatus, comprising:
an operator display module to present an operator application on a display; and
a spotlighter to analyze process plant data collected from a process plant during an operation of the process plant to identify an element of the process plant, to determine whether an operator is interacting with the operator application, and to obscure a first portion of the operator application that does not include the identified element of the process plant if the operator is not interacting with the operator application.

11. An operator station apparatus as defined in claim 10, wherein the identified element of the process plant corresponds to at least one of a most recent alarm, a new alarm, a change in a alarm state, a status change, a flag, a flag change, a new item, a new variable, a most recent change in state, a cluster of alarms, a deviation in the rate of change, a bad input, a bad output, a troublesome control loop, a faulty device, a chronically sticky valve, or a fault.

12. An operator station apparatus as defined in claim 10, wherein the spotlighter is to obscure the first portion of the operator application by:
identifying a geometric region surrounding the identified element of the operator application; and
obscuring the operator application outside the geometric region.

13. An operator station apparatus as defined in claim 10, wherein a second portion of the operator application that includes the identified element is at least one of not obscured or not modified when the first portion is modified.

14. An operator station apparatus as defined in claim 10, wherein the spotlighter is to obscure the first portion of the operator application by at least one of desaturating colors, diminishing in appearance or overlaying an image on the first portion of the operator application.

15. An operator station apparatus as defined in claim 12, wherein the geometric region comprises at least one of a circular region, an oval region, a star shaped region, or a rectangular region.

16. An operator station apparatus as defined in claim 10, wherein the operator station apparatus comprises an operator station of a process plant control system.

17. An operator station apparatus as defined in claim 10, further comprising an operating system to present the operator application and to enable the spotlighter to obscure the first portion of the operator application.

18. An operator station apparatus as defined in claim 10, wherein the operator application comprises an active display window.

19. A tangible article of manufacture storing machine readable instructions that, when executed, cause a machine to draw attention to information presented to a process plant operator by at least:
presenting an electronic process plant display for a process plant in an operational state;
collecting process plant data from the process plant;
processing the process plant data to identify an element of the process plant;
determine whether an operator is interacting with the process plant display; and
if the operator is not interacting with the process plant display, modifying the electronic process plant display to at least partially obscure at least a first portion of the process plant display not including the identified element.

20. An article of manufacture as defined in claim 19, wherein the identified element of the process plant corresponds to at least one of a most recent alarm, a new alarm, a change in a alarm state, a status change, a flag, a flag change, a new item, a new variable, a most recent change in state, a cluster of alarms, a deviation in the rate of change, a bad input, a bad output, a troublesome control loop, a faulty device, a chronically sticky valve, or a fault.

21. An article of manufacture as defined in claim 19, wherein the machine readable instructions, when executed, cause the machine to modify the electronic process plant display by at least:
identifying a geometric region surrounding the identified portion element of the process plant; and
obscuring the electronic process plant display outside the geometric region.

22. An article of manufacture as defined in claim 19, wherein a second portion of the electronic process plant display that includes the identified element is at least one of unobscured or unmodified when the first portion is modified.

23. An article of manufacture as defined in claim 19, wherein the at least the first portion of the electronic process plant display is at least one of desaturated, diminished in appearance or overlaid with a partially transparent image.

24. A method to draw attention to information presented to a process plant operator, the method comprising:
presenting an electronic process plant display for an operating process plant;
collecting process plant data from the operating process plant;
processing the process plant data to identify an element of the operating process plant;
identifying, a first display area not including the identified element of the process plant display and a second display area including the identified element of the process plant display;
highlighting the second display area to draw attention to the element when the operator is interacting with the process plant display; and
obscuring the first display area to draw attention to the element when the operator is not interacting with the process plant display.

25. A method as defined in claim 24, wherein the identified element of the process plant corresponds to at least one of a most recent alarm, a new alarm, a change in a alarm state, a status change, a flag, a flag change, a new item, a new variable, a most recent change in state, a cluster of alarms, a deviation in the rate of change, a bad input, a bad output, a troublesome control loop, a faulty device, a chronically sticky valve, or a fault.

26. A method as defined in claim 24, wherein the second display area of the electronic process plant display is at least one of desaturated, diminished in appearance or overlaid with a partially transparent image.

27. A method as defined in claim 24, wherein the first display area comprises at least one of a circular region, an oval region, or a rectangular region.

28. A method as defined in claim 24, wherein the element of the process plant is associated with a piece of equipment of the process plant.

29. A method as defined in claim 24, wherein the process plant display comprises an inactive display window.

* * * * *